Figure 1:
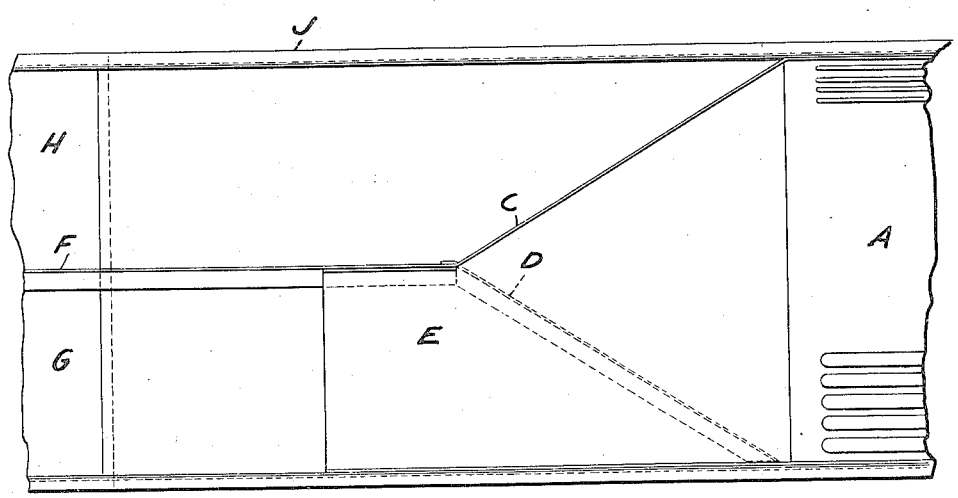

H. H. HASLER.
DEVICE FOR SEGREGATING BY MEANS OF DEFLECTING SURFACES.
APPLICATION FILED MAY 19, 1917.

1,270,944.

Patented July 2, 1918.

Inventor:
Harry H. Hasler

UNITED STATES PATENT OFFICE.

HARRY H. HASLER, OF CRESSON, PENNSYLVANIA.

DEVICE FOR SEGREGATING BY MEANS OF DEFLECTING-SURFACES.

1,270,944.          Specification of Letters Patent.          Patented July 2, 1918.

Application filed May 19, 1917. Serial No. 169,785.

*To all whom it may concern:*

Be it known that I, HARRY H. HASLER, a citizen of the United States, residing at Cresson, in the county of Cambria, State of Pennsylvania, have invented a new Device for Segregating by Means of Deflecting-Surfaces, of which the following is a specification.

My invention relates to an improvement on a device for segregating, by means of deflecting surfaces, of various sizes of coal or other material, after the same has been screened, so that the same will be deposited and conveyed in parallel rows or compartments on an exposed surface or surfaces for inspection or preparation. My device is applicable to a so-called picking table whereon the motion of the material handled is imparted by a shearing action between the material handled and the picking table, such shearing action being caused by a forward stroke or movement of the table and a comparatively quick return or backward stroke or movement of the table and is applied to picking tables of the so-called "Marcus" type or other picking tables where a similar motion is imparted to a picking table by means of a mechanical driving apparatus.

By the old method, the coal, or other material to be handled, is fed on to the so-called picking table (it is understood that screen plates or bars are attached to the picking table at or near the point where the coal or other material is placed on the picking table, and consequently the screening action is caused by the same motion which causes the coal or other material to assume its travel along the picking table) by means of reciprocating feeder or feeders or may be deposited directly from the car or other conveyance. In its passage over the screen, bars, perforated plates, or other device, the finer particles are removed. These fine particles of the material handled are deposited on a deck below the screening surfaces, while the coarser particles pass over the screening surface and are carried along on the upper deck of the picking table where they may be inspected and such particles picked out as may be required. The picking out or separation of these particles is quite difficult owing to the extreme variation in the sizes of the materials which pass over the screens and a like variation in the sizes of the materials which it is desired to have removed. Under the old scheme, but one screening operation is performed. All materials which pass over the screen or screens are passed along the table for inspection or separation of refuse. Naturally this material is composed of particles varying greatly in mass and any attempt to discern or remove particles which it may be desired to discern or remove must be accompanied with unnecessary effort and expense.

Under the new scheme a further separation or grading of the particles is made possible and an inspection and removal of the particles with ease and efficiency is effected. In the preparation of coal or other material it is necessary to separate it into at least three sizes, in some cases four or more sizes are desirable in order to facilitate complete and efficient separation or removal of the particles from the mass handled.

The advantages of the new scheme are as follows:

Impurities or other particles to be removed by hand can best be discerned and more readily picked out when such impurities or particles are of a size similar to the size of the mass with which they are mixed. The scheme as hereinafter described and as shown on the accompanying drawing, admits of the sizing and separation of the coal or other material into three (3) sizes, two (2) of the sizes being placed in parallel rows or compartments, both of which are in a common plane or surface (surfaces may be stepped but needlessly so) and located above the deck carrying the smallest sizes. The application of the deflecting surface or plate and screening deck principle may be carried to four (4) or more sizes if desired. This further sizing may be accomplished by merely adding one (1) set of screens of the desired mesh, one (1) deck and one (1) set of deflecting surfaces or plates for each additional size of material desired to be separated and carried separately on the picking table.

I attain these objects by the mechanism illustrated in the accompanying drawing, in which—

Figure 2:
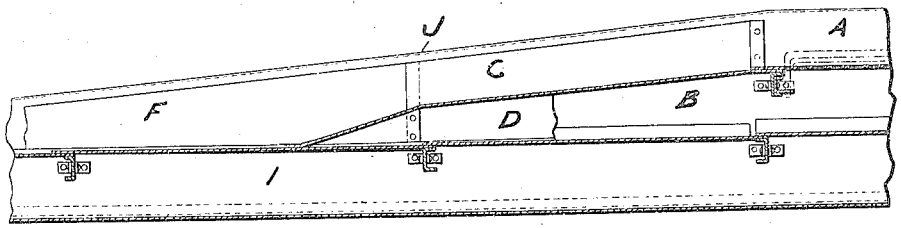

Figure 1 is a plan view, and Fig. 2 is a longitudinal vertical sectional view of my device.

The material reaching screens (A) bars, perforated plates or other screening surface is handled as follows: The material which passes over the screen or screens (A) is deflected by means of deflecting surface plate or plates (C) on the upper deck to compartment (G) provided for the larger size material. The material which passes through the screen or screens (A) is deflected by means of deflecting surface plate or plates (D) between the decks to compartment (H) provided for the smaller size material. Smaller size material than that carried in compartment (H) may be removed before the material reaches screens (A) and may be deposited and carried on a deck below rows or compartments (G) or H or both, and may be discharged at any point independent of the material conveyed in rows or compartments (G) or (H). Usually the slack coal or other material too small to be picked by hand is to be carried on the lower deck just referred to.

I am aware that prior to my invention devices for segregating by means of deflecting surfaces have been made, but as far as I know, have never been applied to picking tables of any description. I therefore do not claim right on the same; but

I claim:

In combination, a reciprocating screen provided with a deck receiving the undersize and reciprocating with the screen, an extension of said deck projecting beyond said screen at an inclination adapted to retain material sufficiently for inspection, said extension being longitudinally subdivided into a plurality of channels, means leading from the screen to one of the channels and adapted to divert the oversize thereto, means for diverting the undersize on the deck to another channel, said extension and the diverting means being connected to the screen to reciprocate therewith.

HARRY H. HASLER.